Patented Sept. 26, 1922.

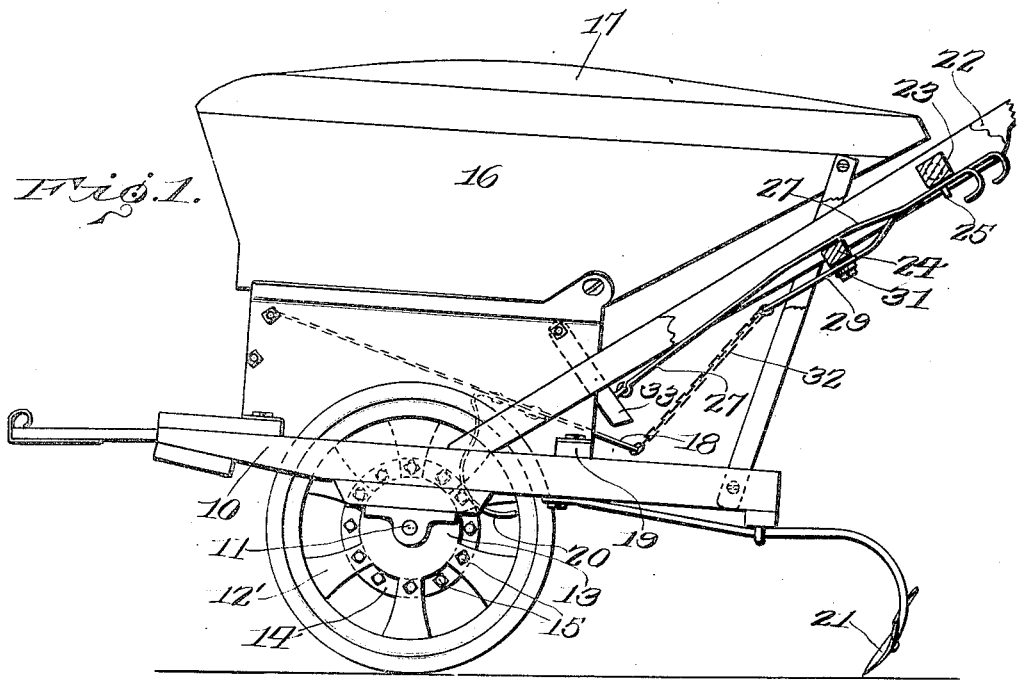
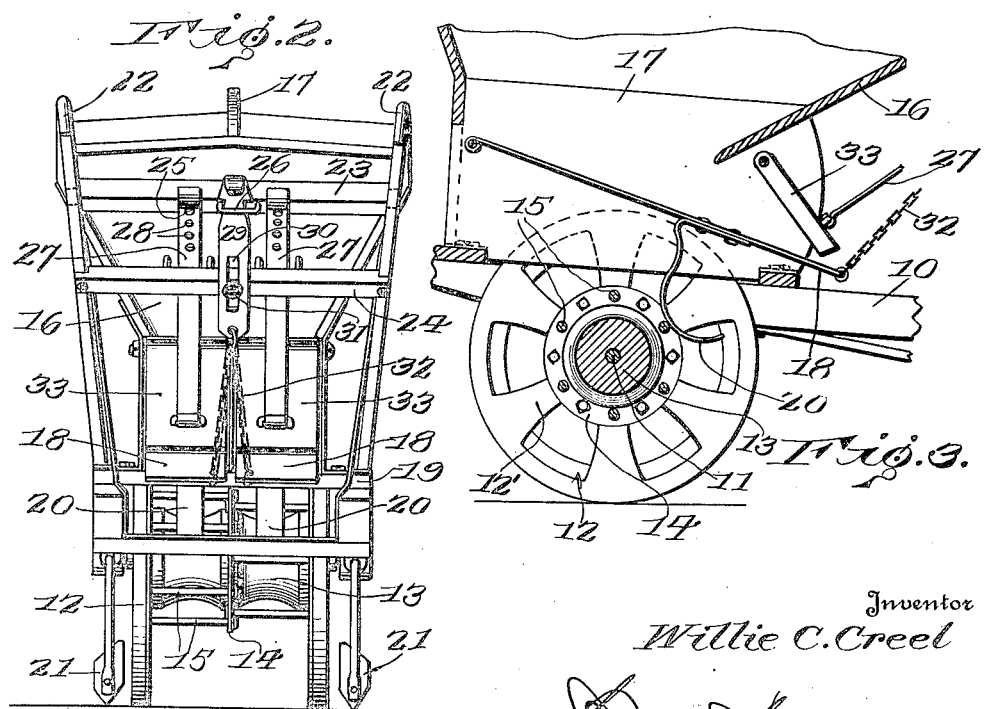

1,430,155

UNITED STATES PATENT OFFICE.

WILLIE C. CREEL, OF HEMINGWAY, SOUTH CAROLINA.

FERTILIZER DISTRIBUTOR.

Application filed October 17, 1921. Serial No. 508,158.

*To all whom it may concern:*

Be it known that I, WILLIE C. CREEL, a citizen of the United States, residing at Hemingway, in the county of Williamsburg, State of South Carolina, have invented certain new and useful Improvements in Fertilizer Distributors; and I do hereby declare the following to be a full, clear, and exact description of the invention, such as will enable others skilled in the art to which it appertains to make and use the same.

This invention relates to new and useful improvements in fertilizer distributors.

One object of the invention is to provide a device of this character which is adapted to hold two or more kinds of fertilizer, which may be distributed together or singly.

Another object is to provide a novel mechanism for discharging the fertilizer from the hopper to the ground, with novel means for cutting off one or both feeds.

Other objects and advantages will be apparent from the following description, when taken in connection with the accompanying drawings.

In the drawings:

Figure 1 is a side elevation of a fertilizer distributor made in accordance with the invention.

Figure 2 is a rear elevation of the same.

Figure 3 is a vertical sectional view through a portion of the hopper and the feed therefor, on the line 3—3 of Figure 2.

Referring particularly to the accompanying drawings, 10 represents a suitable horizontal frame which supports the axle 11, and secured on this axle, inwardly of the frame, are the ground engaging wheels 12. Also secured to the axle, and to the wheels, is a drum 13, a central circumferential flange 14 being carried by the hub and receiving therethrough oppositely extending longitudinal bolts or rods 15. The outer ends of these rods are secured within the spokes 12' of the wheels 12. Mounted on the frame is a hopper 16, the same being divided longitudinally by a central partition 17, thus forming two compartments for containing different kinds of fertilizer. The bottom 18 of each compartment of the hopper is in the form of a metal plate, pivotally supported at its forward end at the front of the hopper and having its rear end extending across the transverse bar 19 of the frame 10. Secured to the lower face of each of the bottoms 18 is a downwardly extending resilient finger 20, the lower end of which is turned upwardly and rearwardly so that the curved convex portion will lie in the path of the rods 15, to be engaged thereby and lifted as the machine proceeds. Suitable ground treating blades 21 are carried by and extend downwardly from the rear of the frame.

Carried by the sides of the frame 10 and extending upwardly and rearwardly where they are connected to the sides of the hopper 16 are the handle bars 22, the upper end portions of which are connected by the transverse bars 23 and 24, the former of which has the rearwardly extending pins 25 and the loop 26 intermediate the pins. Extending upwardly and rearwardly from the bottoms 18 is a flexible strip 27, the same passing over the bar 24 and under or rearwardly of the bar 23, the upper end of said strip being provided with a longitudinal series of openings 28 for interchangeable reception of one of the pins 25. The peculiar relation of the strip 27 to the bars 23 and 24 permit the bars to flex against the rear face of the bar 23 and thus maintain the pin 25 properly engaged within an opening 28.

Slidable through the loop 26 is the upper end of a strip 29, said strip passing rearwardly of the bar 24 and having a longitudinal slot 30 receiving the headed pin 31 therethrough. Connected to the lower end of the strip 29 are the upper ends of a pair of flexible elements 32 which may be chains, wires or the like and said flexible elements have their other ends secured respectively to the rear ends of the bottoms 18.

Pivotally mounted in the rear of each compartment of the hopper is a door 33 and to each of these doors is pivotally connected the lower end of a strip 27.

By moving the strips 27 upwardly or downwardly, the doors 33 may be opened and closed to the degree desired, to permit the proper amount of fertilizer to pass from the hopper, the upper end of the strip being flexed outwardly to disengage it from the pin 25 and then reengaged to hold the door in such position. When the door is moved downwardly to completely closed position, it will rest on the rear end of the bottom 18 and hold the bottom against movement, irrespective of the engagement of the finger 20 with the rods 15. These fingers 20 are flexible so that they may readily flex without affecting the movement of the bottom when said door is engaged therewith, as above mentioned. By manipulating the strips 27, either one or the other of the hoppers may be rendered inactive or both may be rendered active so that either one or both kinds of fertilizer may be distributed. When both hoppers are to be rendered inactive, the member 29 is pulled up so that the bottoms 18 are drawn up tightly against the doors 33 with the result that the fingers 20 are raised sufficiently high to prevent engagement of the rods therewith, thus permitting the machine to be readily moved without actuating the bottoms of the hopper.

What is claimed is:

A fertilizer distributor comprising a frame having upwardly and rearwardly extending handles, cross members between the handles, a hopper on the frame, pivoted doors in the hopper, pins carried by one of the cross members, bars pivotally connected to the doors and slidable between the cross members, said bars having openings for reception of the pins and being resilient to maintain engagement with the pins, a second slidable bar mounted on the cross members, flexible elements connected to the second bar, pivoted bottoms in the hopper and connected with the flexible elements.

In testimony whereof, I affix my signature, in the presence of two witnesses.

WILLIE C. CREEL.

Witnesses:
J. B. BUSHARDT,
J. M. GLEADY.